US012616105B2

(12) United States Patent
Kuo et al.

(10) Patent No.: US 12,616,105 B2
(45) Date of Patent: May 5, 2026

(54) METHOD FOR PRODUCING MYCELIAL SHEET

(71) Applicant: Food Industry Research and Development Institute, Hsinchu (TW)

(72) Inventors: Hsiao-Ping Kuo, Hsinchu (TW); Yi-Tzu Kuo, Hsinchu (TW); Shyue-Tsong Huang, Hsinchu (TW); Han-Yun Li, Hsinchu (TW); Wan-Rou Lin, Hsinchu (TW); Sung-Yuan Hsieh, Hsinchu (TW)

(73) Assignee: Food Industry Research and Development Institute, Hsinchu (TW)

( * ) Notice: Subject to any disclaimer, the term of this patent is extended or adjusted under 35 U.S.C. 154(b) by 0 days.

(21) Appl. No.: 18/968,818

(22) Filed: Dec. 4, 2024

(65) Prior Publication Data

US 2025/0380648 A1     Dec. 18, 2025

(30) Foreign Application Priority Data

Jun. 17, 2024    (TW) ................................. 113122371

(51) Int. Cl.
A01G 18/00          (2018.01)
A01G 31/00          (2018.01)

(52) U.S. Cl.
CPC .............. A01G 18/00 (2018.02); A01G 31/00 (2013.01)

(58) Field of Classification Search
CPC ........... A01G 18/00; A01G 31/00; C12N 1/14
USPC ...................................... 47/1.1, 58.1 R, 59 S
See application file for complete search history.

(56) References Cited

U.S. PATENT DOCUMENTS

| | | | | | |
|---|---|---|---|---|---|
| 5,854,056 | A | * | 12/1998 | Dschida | .................. C12N 1/14 435/256.8 |
| 6,416,978 | B1 | * | 7/2002 | Lee | .......................... C12N 1/14 435/911 |
| 8,298,809 | B2 | * | 10/2012 | Kalisz | ..................... C12N 1/14 435/177 |
| 11,261,422 | B2 | * | 3/2022 | Hayashi | .............. C09D 105/04 |
| 11,297,866 | B2 | * | 4/2022 | Kozubal | .................. A23G 9/36 |
| 12,041,949 | B2 | * | 7/2024 | Ghotra | ...................... A23J 3/14 |
| 12,286,617 | B2 | * | 4/2025 | Gandia | ................... B32B 9/047 |
| 12,409,261 | B2 | * | 9/2025 | Rae | ...................... A61M 1/3679 |
| 2020/0157506 | A1 | * | 5/2020 | Bayer | ....................... A23J 3/00 |
| 2023/0079850 | A1 | * | 3/2023 | Szilvay | ................... D06N 3/02 536/56 |
| 2023/0301337 | A1 | * | 9/2023 | Rühs | ......................... A23J 3/14 |

(Continued)

FOREIGN PATENT DOCUMENTS

CN          117965658 A      5/2024

OTHER PUBLICATIONS

Appels et al., "Fungal mycelium classified in different material families based on glycerol treatment," Commun. Biol., 3 (334), https://doi.org/10.1038/s42003-020-1064-4, (2020).

(Continued)

*Primary Examiner* — Maria E Graber
(74) *Attorney, Agent, or Firm* — Morse, Barnes-Brown & Pendleton, P.C.; Martin Z. Zhang

(57)          ABSTRACT

A method for producing a mycelial sheet includes: subjecting a fungus to static cultivation in a liquid medium containing a cellulose, so as to allow the fungus to form the mycelial sheet on a surface of the liquid medium; and collecting the mycelial sheet from the surface of the liquid medium containing the cellulose.

10 Claims, 1 Drawing Sheet

(56) References Cited

U.S. PATENT DOCUMENTS

| | | | | | |
|---|---|---|---|---|---|
| 2024/0032580 | A1* | 2/2024 | Kozubal | ................. | A23G 9/36 |
| 2024/0068141 | A1* | 2/2024 | Stewart | ................... | D04H 1/64 |
| 2024/0268430 | A1* | 8/2024 | Kozubal | ............. | A23C 9/1203 |

OTHER PUBLICATIONS

El-Enshasy, "Chapter 9. Filamentous Fungal Cultures—Process Characteristics, Products, and Applications," Bioprocessing for Value-Added Products from Renewable Resources, 225-261, (2007).
Guo. et al., "Extraction, Purification, and Characterization of Insoluble Dietary Fiber from Oat Bran," Trans. Tianjin Univ., 27(5), https://doi.org/10.1007/s12209-019-00224-9, (2019).
Wang et al., "Bacterial cellulose production, properties and applications with different culture methods—A review," Carbohydr. Polym., 219:63-76, https://doi.org/10.1016/j.carbpol.2019.05.008, (2019).
Search Report for Taiwanese Application No. 113122371 dated Jul. 16, 2024, with an English translation thereof.

* cited by examiner

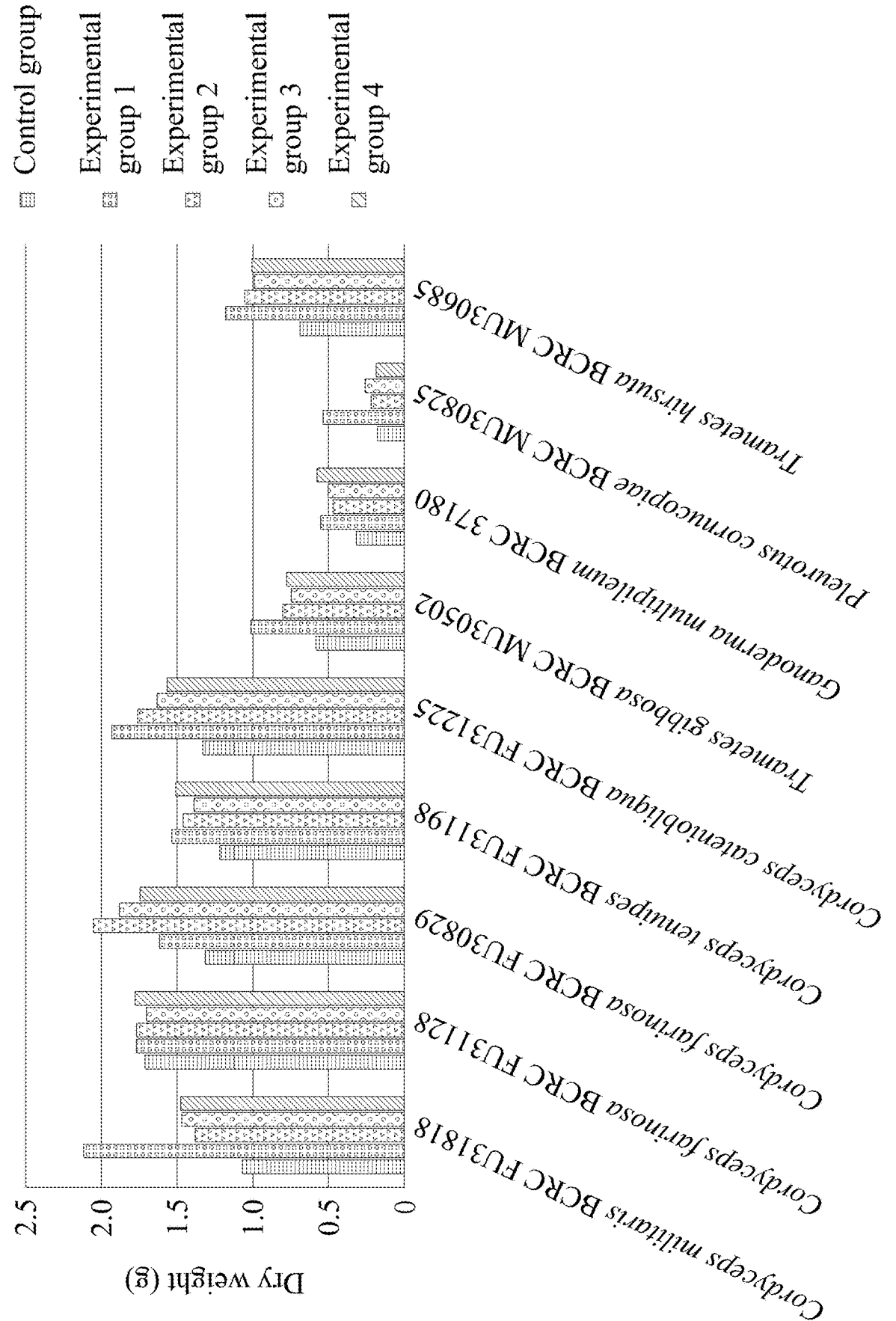

METHOD FOR PRODUCING MYCELIAL SHEET

CROSS-REFERENCE TO RELATED APPLICATION

This application claims priority to Taiwanese Invention patent application No. 113122371, filed on Jun. 17, 2024, the entire disclosure of which is incorporated by reference herein.

FIELD

The disclosure relates to a method for producing a mycelial sheet.

BACKGROUND

A mycelial sheet, also known as mycelial mat, is a sheet material generated from a fungus. The mycelial sheet has been used as a substitute for leather or cloth due to good mechanical property (generally with a tensile strength of approximately 1 MPa to 5 MPa) thereof. The mycelial sheet is mainly composed of mycelia, and some studies have found that adding a cellulose to the mycelial sheet to form a mycelium-cellulose composite material can further improve the mycelial sheet's mechanical property. Currently, one of two commonly used methods for producing the mycelial sheet may include subjecting the fungus to solid-state cultivation, so as to allow the fungus to form the mycelial sheet, followed by collecting the mycelial sheet on a surface of a solid culture medium; another one of the methods may include subjecting the fungus to shaking cultivation in a liquid medium, so as to obtain a resultant liquid culture, followed by subjecting the resultant liquid culture to filtration (in some cases, further subjected to pressing after the filtration), thereby obtaining the mycelial sheet. However, with respect to the aforesaid two methods, the former is more time-consuming, and the latter is more complicated in operation.

SUMMARY

Therefore, an object of the disclosure is to provide a method for producing a mycelial sheet, which can alleviate at least one of the drawbacks of the prior art. The method includes:

subjecting a fungus to static cultivation in a liquid medium containing a cellulose, so as to allow the fungus to form the mycelial sheet on a surface of the liquid medium; and collecting the mycelial sheet from the surface of the liquid medium containing the cellulose.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

The FIGURE shows a dry weight of a mycelial sheet determined in each group of each fungal strain of Example 1, infra.

DETAILED DESCRIPTION

It is to be understood that, if any prior art publication is referred to herein, such reference does not constitute an admission that the publication forms a part of the common general knowledge in the art, in Taiwan or any other country.

For the purpose of this specification, it will be clearly understood that the word "comprising" means "including but not limited to", and that the word "comprises" has a corresponding meaning.

Unless otherwise defined, all technical and scientific terms used herein have the meaning commonly understood by a person skilled in the art to which the present disclosure belongs. One skilled in the art will recognize many methods and materials similar or equivalent to those described herein, which could be used in the practice of the present disclosure. Indeed, the present disclosure is in no way limited to the methods and materials described.

By conducting research, the applicant surprisingly found that by subjecting a fungus to static cultivation in a liquid medium containing a cellulose, a mycelial sheet can be formed on a surface of the liquid medium, which not only makes forming of the mycelial sheet quick and easy, but also allows the mycelial sheet to be completely formed and to have a good tensile strength.

Therefore, the present disclosure provides a method for producing a mycelial sheet, which includes:

subjecting a fungus to static cultivation in a liquid medium containing a cellulose, so as to allow the fungus to form the mycelial sheet on a surface of the liquid medium; and collecting the mycelial sheet from the surface of the liquid medium containing the cellulose.

As used herein, the terms "mycelial sheet," "mycelial mat," "fungal sheet" and "fungal mat" can be interchangeably used, and mean a continuous flat sheet formed by interconnection of fungal hyphae.

As used herein, the term "fungus" is intended to cover any fungal species that is capable of producing a mycelium (i.e., a mycelium-producing fungus or a filamentous fungus). Examples of the fungal species may include, but are not limited to, *Cordyceps* spp., *Trametes* spp., *Ganoderma multipileum, Inonotus tabacinus, Irpex brevis, Pleurotus cornucopiae, Schizophyllum commune, Terana coerulea*, and combinations thereof.

In certain embodiments, the *Cordyceps* spp. may be selected from the group consisting of *Cordyceps cateniobliqua, Cordyceps farinosa, Cordyceps militaris, Cordyceps tenuipes*, and combinations thereof. In some embodiments, the *Cordyceps farinosa* may be *Cordyceps farinosa* deposited at the Bioresource Collection and Research Center (BCRC) under an accession number BCRC FU30829, or *Cordyceps farinosa* deposited at the BCRC under an accession number BCRC FU31128. In still some embodiments, the *Cordyceps tenuipes* may be *Cordyceps tenuipes* deposited at the BCRC under an accession number BCRC FU31198. In yet some embodiments, the *Cordyceps cateniobliqua* may be *Cordyceps cateniobliqua* deposited at the BCRC under an accession number BCRC FU31225. In still yet some embodiments, the *Cordyceps militaris* may be *Cordyceps militaris* deposited at the BCRC under an accession number BCRC FU31818. In other embodiments, the *Cordyceps* spp. may be selected from the group consisting of the *Cordyceps farinosa* deposited at the BCRC under the accession number BCRC FU30829, the *Cordyceps farinosa* deposited at the BCRC under the accession number BCRC FU31128, the *Cordyceps tenuipes* deposited at the BCRC under the accession number BCRC FU31198, the *Cordyceps cateniobliqua* deposited at the BCRC under the accession number BCRC FU31225, the *Cordyceps militaris* deposited at the BCRC under the accession number BCRC FU31818, and combinations thereof.

In certain embodiments, the *Trametes* spp. may be selected from the group consisting of *Trametes hirsuta, Trametes gibbosa, Trametes versicolor*, and combinations thereof. In some embodiments, the *Trametes gibbosa* may be *Trametes gibbose* deposited at the BCRC under an accession number BCRC MU30502. In still some embodiments, the *Trametes hirsuta* may be *Trametes hirsuta* deposited at the BCRC under an accession number BCRC MU30685. In still some embodiments, the *Trametes versicolor* may be *Trametes versicolor* deposited at the BCRC under an accession number BCRC MU30810. In other embodiments, the *Trametes* spp. may be selected from the group consisting of the *Trametes gibbose* deposited at the BCRC under the accession number BCRC MU30502, the *Trametes hirsuta* deposited at the BCRC under the accession number BCRC MU30685, the *Trametes versicolor* deposited at the BCRC under the accession number BCRC MU30810, and combinations thereof.

In certain embodiments, the *Ganoderma multipileum* may be *Ganoderma multipileum* deposited at the BCRC under an accession number BCRC 37180. In certain embodiments, the *Inonotus tabacinus* may be *Inonotus tabacinus* deposited at the BCRC under an accession number BCRC MU30009. In certain embodiments, the *Irpex brevis* may be *Irpex brevis* deposited at the BCRC under an accession number BCRC 35360. In certain embodiments, the *Pleurotus cornucopiae* may be *Pleurotus cornucopiae* deposited at the BCRC under an accession number BCRC MU30825. In certain embodiments, the *Schizophyllum commune* may be *Schizophyllum commune* deposited at the BCRC under an accession number BCRC MU30359. In certain embodiments, the *Terana coerulea* may be *Terana coerulea* deposited at the BCRC under an accession number BCRC MU30808. In other embodiments, the fungus may be selected from the group consisting of the *Ganoderma multipileum* deposited at the BCRC under the accession number BCRC 37180, the *Inonotus tabacinus* deposited at the BCRC under the accession number BCRC MU30009, the *Irpex brevis* deposited at the BCRC under the accession number BCRC 35360, the *Pleurotus cornucopiae* deposited at the BCRC under the accession number BCRC MU30825, the *Schizophyllum commune* deposited at the BCRC under the accession number BCRC MU30359, the *Terana coerulea* deposited at the BCRC under the accession number BCRC MU30808, and combinations thereof.

According to the present disclosure, the cellulose may be a commercially available product, or may be obtained from a natural source using microbiological techniques and/or isolation techniques well known to those skilled in the art. In this regard, those skilled in the art may refer to, e.g., Wang J. et al. (2019), *Carbohydr. Polym.*, 219:63-76, or Guo. Y. et al. (2021), *Trans. Tianjin Univ.*, 27(5):385-393.

Alternatively, the cellulose may be made by utilizing synthetic techniques well known to those skilled in the art.

In certain embodiments, the method for producing the mycelial sheet may further include, subjecting the mycelial sheet collected from the surface of the liquid medium containing the cellulose to a washing treatment, so as to remove the cellulose.

In certain embodiments, the cellulose may be selected from the group consisting of a bacterial cellulose, a plant cellulose, and a combination thereof.

As used herein, the term "bacterial cellulose" means a cellulose that is produced by natural mechanism in bacterial cells. Examples of a bacterial species suitable for use in the present disclosure may include, but are not limited to, *Acetobacter* spp., *Gluconacetobacter* spp., *Komagataeibacter* spp., *Alcaligenes* spp., *Pseudomonas* spp., *Rhizobium* spp., *Argobacterium* spp., and *Scarcina* spp. In some embodiments, the *Gluconacetobacter* spp. may be *Gluconacetobacter xylinus* (also known as *Komagataeibacter xylinus*; formerly named as *Acetobacter xylinum*).

As used herein, the term "plant cellulose" means a cellulose produced by a plant species. Examples of the plant species suitable for use in the present disclosure may include, but are not limited to, *Solanum* spp., *Triticum* spp., and *Avena* spp. In some embodiments, the *Solanum* spp. may be *Solanum tuberosum*. In still some embodiments, the *Triticum* spp. may be *Triticum aestivum* L. In yet some embodiments, the *Avena* spp. may be *Avena sativa*.

According to the present disclosure, the cellulose may have a particle size ranging from 0.035 mm to 4.0 mm.

In certain embodiments, the cellulose may be the bacterial cellulose having a particle size of not lower than 0.035 mm to less than 3.0 mm.

In certain embodiments, the cellulose may be the plant cellulose having a particle size ranging from 0.035 mm to 0.09 mm. In an exemplary embodiment, the particle size of the plant cellulose is 0.035 mm. In another exemplary embodiment, the particle size of the plant cellulose is 0.09 mm.

According to the present disclosure, the liquid medium containing the cellulose may be prepared by adding the cellulose to a basic medium that is suitable for growth of fungal mycelia.

According to the present disclosure, the cellulose may be present in an amount ranging from 0.05 wt % to 0.5 wt % based on 100 wt % of the liquid medium. In an exemplary embodiment, the cellulose is present in an amount of 0.15 wt % based on 100 wt % of the liquid medium. In another exemplary embodiment, the cellulose is present in an amount of 0.5 wt % based on 100 wt % of the liquid medium.

In certain embodiments, the cellulose is the bacterial cellulose, and the mycelial sheet is free from the bacterial cellulose (i.e., the mycelial sheet is composed solely of the fungal hyphae). In certain embodiments, the cellulose is the plant cellulose, and the mycelial sheet is free from the plant cellulose (i.e., the mycelial sheet is composed solely of the fungal hyphae). In certain embodiments, the cellulose is the combination of the bacterial cellulose and the plant cellulose, and the mycelial sheet is free from the combination of the bacterial cellulose and the plant cellulose (i.e., the mycelial sheet is composed solely of the fungal hyphae).

According to the present disclosure, the basic medium suitable for the growth of fungal mycelia is well known to those skilled in the art, and may be a self-formulated medium, or a commercially available product. Examples of the basic medium may include, but are not limited to, a malt extract broth (MEB) medium and a potato dextrose broth (PDB) medium.

The basic medium suitable for use in the present disclosure may contain a carbon source selected from the group consisting of a glucose, a fructose, a lactose, a sucrose, a maltose, a galactose, a mannose, a trehalose, a starch, a potato starch, a malt extract, a maltodextrin, a dextrin, a corn flour, and combinations thereof.

The basic medium suitable for use in the present disclosure may contain a nitrogen source selected from the group consisting of a peptone, a polypeptone, ammonium sulfate $((NH_4)_2SO_4)$, ammonium nitrate $(NH_4NO_3)$, ammonium chloride ($NH_4Cl$), ammonium citrate, a casamino acid, a tryptone, a meat extract, a yeast extract, a yeast powder, a milk, a skimmed milk powder, a casein, a soybean flour, a whey, an amino acid, and combinations thereof.

As used herein, the term "static cultivation" means a culture performed under a stationary condition without stirring or shaking, e.g., performed in an incubator in a stationary mode.

As used herein, the term "cultivation" and "culturing" may be interchangeably used.

According to the present disclosure, procedures and parameter conditions regarding the static cultivation are within the expertise and routine skills of those skilled in the art. In this regard, reference may be made to, e.g., El-Enshasy H. A. (2007), *Bioprocessing for Value-Added Products from Renewable Resources,* 225-261.

According to the present disclosure, the static cultivation may be carried out at a temperature ranging from 20° C. to 30° C. for 7 days to 28 days. In an exemplary embodiment, the static cultivation is carried out at a temperature of 25° C. for 14 days.

The disclosure will be further described by way of the following examples. However, it should be understood that the following examples are intended solely for the purpose of illustration and should not be construed as limiting the present disclosure in practice.

EXAMPLES

General Experimental Materials

1. Malt Extract Agar (MEA) Plate

The MEA plate used in the following examples was prepared using different ingredients dissolved in reverse osmosis water and each having a certain concentration, as shown in Table 1 below.

TABLE 1

| Ingredient | Concentration (g/L) |
|---|---|
| Malt extract | 20 |
| Peptone | 1 |
| Glucose | 20 |
| Agar | 15 |

2. Malt Extract Broth (MEB) Medium

The MEB medium used in the following examples was prepared using different ingredients dissolved in reverse osmosis water and each having a certain concentration, as shown in Table 2 below.

TABLE 2

| Ingredient | Concentration (g/L) |
|---|---|
| Malt extract | 20 |
| Peptone | 1 |
| Glucose | 20 |

3. Fungal Strains

The fungal strains used in the following examples were purchased from the Bioresource Collection and Research Center (BCRC) of the Food Industry Research and Development Institute (FIRDI) (No. 331, Shih-Pin Rd., Hsinchu City 300, Taiwan). The fungal strains included:

(1) *Cordyceps* spp., such as *Cordyceps farinosa* deposited at the BCRC under an accession number BCRC FU30829 (hereinafter "*Cordyceps farinosa* BCRC FU30829"), *Cordyceps farinosa* deposited at the BCRC under an accession number BCRC FU31128 (hereinafter "*Cordyceps farinosa* BCRC FU31128"), *Cordyceps tenuipes* deposited at the BCRC under an accession number BCRC FU31198 (hereinafter "*Cordyceps tenuipes* BCRC FU31198"), *Cordyceps cateniobliqua* deposited at the BCRC under an accession number BCRC FU31225 (hereinafter "*Cordyceps cateniobliqua* BCRC FU31225"), and *Cordyceps militaris* deposited at the BCRC under an accession number BCRC FU31818 (hereinafter "*Cordyceps militaris* BCRC FU31818");

(2) *Trametes* spp., such as *Trametes gibbosa* deposited at the BCRC under an accession number BCRC MU30502 (hereinafter "*Trametes gibbosa* BCRC MU30502"), *Trametes hirsuta* deposited at the BCRC under an accession number BCRC MU30685 (hereinafter "*Trametes hirsuta* BCRC MU30685"), and *Trametes versicolor* deposited at the BCRC under an accession number BCRC MU30810 (hereinafter "*Trametes versicolor* BCRC MU30810");

(3) *Terana coerulea* deposited at the BCRC under an accession number BCRC MU30808 (hereinafter "*Terana coerulea* BCRC MU30808");

(4) *Inonotus tabacinus* deposited at the BCRC under an accession number BCRC MU30009 (hereinafter "*Inonotus tabacinus* BCRC MU30009");

(5) *Schizophyllum commune* deposited at the BCRC under an accession number BCRC MU30359 (hereinafter "*Schizophyllum commune* BCRC MU30359");

(6) *Pleurotus cornucopiae* deposited at the BCRC under an accession number BCRC MU30825 (hereinafter "*Pleurotus cornucopiae* BCRC MU30825");

(7) *Irpex brevis* deposited at the BCRC under an accession number BCRC 35360 (hereinafter "*Irpex brevis* BCRC 35360"); and (8) *Ganoderma multipileum* deposited at the BCRC under an accession number BCRC 37180 (hereinafter "*Ganoderma multipileum* BCRC 37180").

4. Preparation of Inoculum

Each of the aforesaid fungal strains was inoculated into the MEA plate (with a diameter of 9 cm), and then cultured at 25° C. for 1 week to 3 weeks, so as to obtain a mycelium formed on the MEA plate. Thereafter, the mycelium was cut into mycelial pieces, and then the mycelial pieces were added to 90 ml of sterile water, so as to form a mixture, followed by subjecting the mixture to a homogenization treatment with a homogenizer (Oster, Model: BO-00001), thereby obtaining a homogenate. Next, the homogenate was inoculated into the MEB medium at an inoculation amount of 10 vol % based on a total amount of the homogenate and the MEB medium as 100 vol %, followed by shaking cultivation in a thermostatic shaking incubator (25° C., 150 rpm) for 5 days to 7 days, thereby obtaining a resultant culture which was to be used as an inoculum of the fungal strain.

5. Cellulose

In the following Example 1, the potato cellulose (with a particle size of 0.09 mm) (Cat. No. Pot 90) was purchased from Pennant Hills Pty Ltd., and both the wheat cellulose (with a particle size of 0.035 mm) (Cat. No. WF600-30) and the oat cellulose (with a particle size of 0.0035 mm) (Cat. No. HF600-30) were purchased from Gem Font Corporation. In addition, the bacterial cellulose (with a particle size of less than 3 mm) was obtained by using *Gluconacetobacter xylinus* which produced a biofilm, and then the biofilm was washed and neutralized with water, followed by a homogenization treatment and lyophilization. Moreover, the bacterial cellulose pulp (with a particle size of less than 3 mm) (Cat. No. ND-A1018-HA-B7) used in the following Examples 2 and 3 was purchased from Chia Meei Food Industrial Corporation. Prior to use, the bacterial cellulose pulp was subjected to a homogenization treatment to form a homogenized bacterial cellulose material, followed by subjecting the homogenized bacterial cellulose material to determination of an amount of bacterial cellulose thereof, which was 1 wt %.

Example 1. Effect of Using Cellulose from Different Sources on Generation of Mycelial Sheet in Static Cultivation

Experimental Procedures and Results

First, the inoculum of each of the *Cordyceps militaris* BCRC FU31818, the *Cordyceps farinosa* BCRC FU31128, the *Cordyceps farinosa* BCRC FU30829, the *Cordyceps tenuipes* BCRC FU31198, the *Cordyceps cateniobliqua* BCRC FU31225, the *Trametes gibbosa* BCRC MU30502, the *Ganoderma multipileum* BCRC 37180, the *Pleurotus cornucopiae* BCRC MU30825, and the *Trametes hirsuta* BCRC MU30685 obtained in Section 4 of General Experimental Materials was divided into five groups, including one control group and four experimental groups (i.e., experimental groups 1 to 4). Next, each group of the inoculum of each of the aforesaid fungal strains was inoculated into a corresponding liquid medium (in a culture bottle having a bottom diameter of 8 cm), which contained the MEB medium described in Section 2 of General Experimental Materials and/or a certain kind of the cellulose described in Section 5 of General Experimental Materials, at an inoculation amount of 10 vol % (based on a total amount of the corresponding liquid medium and the inoculum as 100 vol %), as shown in Table 3 below, followed by conducting static cultivation in a thermostatic incubator (25° C.) for 14 days. Thereafter, a mycelial sheet formed on a surface of each of the liquid media was subjected to observation, and then was collected and washed with water, followed by conducting thermal drying at 40° C. overnight and measurement of a dry weight of the mycelial sheet.

TABLE 3

| Group | Cellulose | Final concentration |
|---|---|---|
| Control group | — | 0 |
| Experimental group 1 | Bacterial cellulose | 0.5 wt % based on 100 |
| Experimental group 2 | Potato cellulose | wt % of liquid medium |
| Experimental group 3 | Wheat cellulose | |
| Experimental group 4 | Oat cellulose | |

For each of the fungal strains mentioned above, the mycelial sheet formed in each of the experimental groups 1 to 4 was observed to have a complete form, whereas the mycelial sheet formed in the control group was observed to not have such complete form (data not shown). Referring to the FIGURE, for each of the fungal strains, the dry weights of the mycelial sheets measured in the experimental groups 1 to 4 show varying degrees of increase compared with the dry weight of the mycelial sheet measured in the control group, where the dry weight of the mycelial sheet measured in the experimental group 1 of the *Cordyceps militaris* BCRC FU31818 has the highest degree of increase. Additionally, in this example, the applicant also used the inoculum of each of the *Terana coerulea* BCRC MU30808 and the *Irpex brevis* BCRC 35360 to conduct the aforesaid experiments, and similar results were obtained (data not shown).

Furthermore, the applicant also selected the mycelial sheet of the *Cordyceps militaris* BCRC FU31818 obtained in Experimental group 1 as a representative for determining mechanical strength thereof by utilizing a tensile testing machine (Instron 5965) and with reference to the methods described in Appels F. V. W. et al. (2020), *Commun. Biol.*, 26; 3(1):334. The results showed that a tensile strength of the mycelial sheet could reach up to 6.11 MPa.

These results show that by subjecting a fungus to static cultivation in a liquid medium containing a cellulose, particularly a bacterial cellulose, a mycelial sheet, which is generated from the fungus, has a complete form, and good mechanical strength, can be formed on a surface of the liquid medium, and an enhancement in the yield of the mycelial sheet can also be achieved.

Example 2. Effect of Using Cellulose in Different Concentrations on Generation of Mycelial Sheet in Static Cultivation

Experimental Procedures and Results

First, the inoculum of the *Cordyceps militaris* BCRC FU31818 described in Section 4 of General Experimental Materials was divided into seven groups, including one control group and six experimental groups (i.e., experimental groups 1 to 6). Next, each group of the inoculum of the *Cordyceps militaris* BCRC FU31818 was inoculated into a corresponding liquid medium (in a culture bottle having a bottom diameter of 8 cm), which contained the MEB medium described in Section 2 of General Experimental Materials and/or a certain amount of the homogenized bacterial cellulose material described in Section 5 of General Experimental Materials, at an inoculation amount of 10 vol % (based on a total amount of the corresponding liquid medium and the inoculum as 100 vol %). The final concentration of the bacterial cellulose for each group was summarized in Table 4 below. After static cultivation in a thermostatic incubator (25° C.) for 14 days, a mycelia sheet formed on a surface of each of the liquid media was subjected to observation, and then was collected and washed with water, followed by conducting thermal drying at 40° C. overnight and measurement of a dry weight of the mycelial sheet.

TABLE 4

| Group | Final concentration of bacterial cellulose (wt %) |
|---|---|
| Control group | 0 |
| Experimental group 1 | 0.05 |
| Experimental group 2 | 0.10 |
| Experimental group 3 | 0.15 |
| Experimental group 4 | 0.20 |
| Experimental group 5 | 0.25 |
| Experimental group 6 | 0.30 |

The results show that the mycelial sheet formed in each of the experimental groups 1 to 6 was observed to have a complete form, whereas the mycelial sheet formed in the control group was observed to not have such complete form (data not shown). Referring to Table 5 below, the dry weight of the mycelial sheet measured in each of the experimental groups 1 to 6 show a significant increase compared with the dry weight of the mycelial sheet measured in the control group. These results show that by virtue of subjecting a fungus to static cultivation in liquid media containing the bacterial cellulose that was present in an amount within a range from 0.05 wt % to 0.30 wt % based on 100 wt % of the liquid medium, a mycelial sheet, which is generated from the fungus and has a complete form, can be formed on a surface of each of the liquid media, and in particular, a significant increase in the yield of the mycelial sheet can be achieved when the bacterial cellulose was present in the amount ranging from 0.15 wt % to 0.30 wt % based on 100 wt % of the liquid medium.

TABLE 5

| Group | Dry weight (g) |
| --- | --- |
| Control group | 1.07 |
| Experimental group 1 | 1.58 |
| Experimental group 2 | 1.75 |
| Experimental group 3 | 1.87 |
| Experimental group 4 | 1.81 |
| Experimental group 5 | 1.83 |
| Experimental group 6 | 1.83 |

Example 3. Production of Mycelial Sheet Having Large Area Size

Experimental Procedures and Results

The inoculum of each of the *Cordyceps militaris* BCRC FU31818, the *Ganoderma multipileum* BCRC 37180, the *Cordyceps farinosa* BCRC FU30829, the *Cordyceps tenuipes* BCRC FU31198, the *Cordyceps cateniobliqua* BCRC FU31225, the *Inonotus tabacinus* BCRC MU30009, the *Schizophyllum commune* BCRC MU30359, the *Trametes gibbosa* BCRC MU30502, the *Trametes hirsuta* BCRC MU30685, the *Trametes versicolor* BCRC MU30810, and the *Pleurotus cornucopiae* BCRC MU30825 described in Section 4 of General Experimental Materials was subjected to formation of a mycelia sheet using procedures similar to those described in Example 2, except that a final concentration of the bacterial cellulose in the liquid medium for the respective fungal strain was 0.20 wt % based on 100 wt % of the liquid medium, a bottom area of a culture bottle used for receiving the liquid medium was 20 cm×20 cm, and static cultivation was performed for a period ranging from 7 days to 28 days. The results show that each of the aforesaid fungal strains is capable of forming a mycelial sheet that has a complete form.

Therefore, the applicant further conducted an additional experiment using the aforesaid procedures, except that, in the additional experiment, for each of the abovementioned fungal strains, a culture bottle had a bottom area of 54 cm×41 cm, and found that a mycelial sheet having a complete form could also be formed (not shown).

Based on the results from Examples 1 to 3, the applicant believes that not only a mycelial sheet can be easily produced by subjecting a fungus to static cultivation in a liquid medium containing a cellulose, but also the mycelia sheet thus obtained has a complete form and good mechanical strength. Accordingly, the mycelial sheet can be used to replace a conventional mycelium-cellulose composite material, thereby serving as a substitute for leather or cloth.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, FIGURE, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A method for producing a mycelial sheet, comprising:
subjecting a fungus to static cultivation in a liquid medium containing a cellulose having a particle size ranging from 0.035 mm to 4 mm, so as to allow the fungus to form the mycelial sheet on a surface of the liquid medium;
collecting the mycelial sheet from the surface of the liquid medium containing the cellulose; and
subjecting the mycelial sheet collected from the surface of the liquid medium containing the cellulose to a washing treatment so as to remove the cellulose, wherein the mycelial sheet is free of the cellulose and the static cultivation is the only cultivation performed in the method and the static cultivation is performed under a stationary condition without stirring or shaking.

2. The method as claimed in claim 1, wherein the cellulose is present in an amount ranging from 0.05 wt % to 0.5 wt % based on 100 wt % of the liquid medium.

3. The method as claimed in claim 1, wherein the cellulose is selected from the group consisting of a bacterial cellulose, a plant cellulose, and a combination thereof.

4. The method as claimed in claim 3, wherein the plant cellulose is selected from the group consisting of a potato cellulose, a wheat cellulose, an oat cellulose, and combinations thereof.

5. The method as claimed in claim 3, wherein when the liquid medium contains the bacterial cellulose, the mycelial sheet thus obtained is free from the bacterial cellulose.

6. The method as claimed in claim 3, wherein when the liquid medium contains the plant cellulose, the mycelial sheet thus obtained is free from the plant cellulose.

7. The method as claimed in claim 3, wherein when the liquid medium contains the combination of the bacterial cellulose and the plant cellulose, the mycelial sheet thus obtained is free from the combination of the bacterial cellulose and the plant cellulose.

8. The method as claimed in claim 1, wherein the fungus is selected from the group consisting of *Cordyceps* spp., *Trametes* spp., *Ganoderma multipileum, Inonotus tabacinus, Irpex brevis, Pleurotus cornucopiae, Schizophyllum commune, Terana coerulea*, and combinations thereof.

9. The method as claimed in claim 8, wherein the *Cordyceps* spp. is selected from the group consisting of *Cordyceps cateniobliqua, Cordyceps farinosa, Cordyceps militaris, Cordyceps tenuipes*, and combinations thereof.

10. The method as claimed in claim 8, wherein the *Trametes* spp. is selected from the group consisting of *Trametes hirsuta, Trametes gibbosa, Trametes versicolor*, and combinations thereof.

\* \* \* \* \*